United States Patent [19]

Muramoto et al.

[11] Patent Number: 5,198,500
[45] Date of Patent: Mar. 30, 1993

[54] PROCESS FOR PREPARING CROSSLINKED RESIN PARTICLES

[75] Inventors: Hisaichi Muramoto, Hirakata; Yusuke Ninomiya, Nishinomiya; Keizou Ishii, Ashiya; Shinichi Ishikura, Tsuzuki, all of Japan

[73] Assignee: Nippon Paint Co., Ltd., Japan

[21] Appl. No.: 641,301

[22] Filed: Jan. 15, 1991

[30] Foreign Application Priority Data

Jan. 16, 1990 [JP] Japan ................................ 2-6576

[51] Int. Cl.$^5$ .................... C08F 279/02; C08F 255/10; C08L 31/02; C08L 63/00
[52] U.S. Cl. ................................ 525/244; 525/260; 525/286; 525/296; 525/302; 525/304; 525/309; 525/310; 525/313; 525/316; 525/319; 525/412; 525/415; 525/107; 525/178; 525/193; 525/227; 525/228; 528/354; 526/270
[58] Field of Search ............... 525/244, 260, 286, 296, 525/302, 304, 309, 310, 313, 316, 319, 412, 415, 107, 178, 193, 227, 228; 528/354; 526/270

[56] References Cited

U.S. PATENT DOCUMENTS

| | | | |
|---|---|---|---|
| 4,460,749 | 7/1984 | Lindner et al. | 525/310 |
| 4,521,567 | 6/1985 | Arndt et al. | 525/309 |
| 4,567,234 | 1/1986 | Meunier | 525/302 |
| 4,801,646 | 1/1989 | Henton | 525/304 |
| 4,906,698 | 3/1990 | Kusano et al. | 525/304 |
| 5,010,121 | 4/1991 | Yeates et al. | 525/386 |

FOREIGN PATENT DOCUMENTS

| | | |
|---|---|---|
| 0351141 | 1/1990 | European Pat. Off. |
| 0440444 | 7/1991 | European Pat. Off. |
| 2048941 | 12/1980 | United Kingdom |

OTHER PUBLICATIONS

Derwent Publication-Abstract of JP-A-62 220 508, Sep. 1987.

*Primary Examiner*—James J. Seidleck
*Assistant Examiner*—Vasu S. Jagannathan
*Attorney, Agent, or Firm*—Townsend, Snider & Banta

[57] ABSTRACT

Disclosed is an improved process of the post-emulsion method capable of forming crosslinked resin particles which do not have fusion bonds between particles and which have good storage stability and good redispersibility in an aqueous medium. The process comprises (a) dispersing in an aqueous medium a resinous component comprising (I) a base resin having a glass transition temperature (Tg) of 0° C. or less and a polymerizable double bond, (II) a monomer which, when polymerized, provides a resin of which Tg is 20° C. higher than that of said base resin, or a resin of which Tg is 20° C. higher than that of the base resin, and (III) a polyvinyl compound; (b) crosslinking inside the dispersed resin particles and; (c) removing the aqueous medium therefrom.

15 Claims, No Drawings

PROCESS FOR PREPARING CROSSLINKED RESIN PARTICLES

FIELD OF THE INVENTION

The present invention relates to a process for preparing crosslinked resin particles without fusion bonds between particles, from a resin having a low glass transition temperature, and the obtained resin particles therefrom which are redispersible in an aqueous medium and have good storage stability.

BACKGROUND OF THE INVENTION

Crosslinked resin particles are widely used for paint, resin molding, adhesives, ink, cosmetics, printing plates, photoresist and like. The crosslinked resin particles are generally prepared by an emulsion polymerization method, a grinding method and a so-called post-emulsion method (Japanese Kokai Publication 156717/1985). The post-emulsion method is a method wherein a resin is dispersed in water and three dimensionally crosslinked within the dispersed resin particles to form crosslinked resin particles which are then take out from water.

In the post-emulsion method, however, since the surface of the obtained crosslinked resin particles is easily plastified, fusion bonds between particles often occur during the water removing step and large fused particles are obtained. Also, water to be removed is trapped in the large fused particles. These problems are seriously observed when the resin component to be dispersed in water is thermoplastic and has a low glass transition temperature (Tg), for example acryl rubber, polybutadiene, polyisoprene, chloroprene, poly-epsilon-caprolactone and polytetramethyleneglycol. The crosslinked resin particles prepared by the post-emulsion method from such thermoplastic resin also have poor redispersibility in an aqueous medium and have therefore not been practically produced.

SUMMARY OF THE INVENTION

The present invention provides an improved process of the post-emulsion method capable of forming crosslinked resin particles which do not have the above mentioned problems, especially fusion bonds between particles, and which have good storage stability and redispersibility in an aqueous medium. The process comprises
(a) dispersing in an aqueous medium a resinous component comprising
  (I) a base resin having a glass transition temperature (Tg) of 0 ° C. or less and a polymerizable double bond,
  (II) a monomer which, when polymerized, provides a resin of which Tg is 20 ° C. higher than that of said base resin, or a resin of which Tg is 20 ° C. higher than that of said base resin, and
  (III) a polyvinyl compound
(b) crosslinking inside the dispersed resin particles and
(c) removing said aqueous medium therefrom.

The present invention also provides crosslinked resin particles obtained by the above process.

DETAILED DESCRIPTION OF THE INVENTION

The base resin (I) is a resin which has a glass transition temperature (Tg) of 0 ° C. or less and a polymerizable double bond. Typical examples of the resins (I) are acryl rubber (Tg= −10 to −40 ° C.), polybutadiene (Tg= 95 to −110 ° C.), polyisoprene (Tg= −63° to −72 ° C.), chloroprene (Tg= −45 ° C.), styrene-butadiene rubber (Tg= −40 ° C.), acrylonitrile-butadiene rubber (Tg= −20° to −50 ° C.), butyl rubber (Tg= −67° to −75 ° C.), poly-epsilon-caprolactone (Tg=-60 °C.) and polytetramethyleneglycol (Tg= −40° to −100 ° C.). A block copolymer, such as styrene-butadiene-styrene (SBS) and styrene-isoprene-styrene (SIS), can also be used as long as the resin contains styrene in a small amount and has an average glass transition temperature of 0 ° C. or less. Since the base resin (I) is dispersed in an aqueous medium, it is preferred that the above listed resin may be modified by introducing water dispersible or soluble group, if necessary. The modification is known to the art, but for example can be conducted by introducing a maleic group which is neutralized with an amine, or by introducing a monomer having a hydrophilic group. The base resin preferably has a number average molecular weight of about 500 to 1,000,000.

The component (II) of the resinous component can be either a monomer or a resin, but it is required that the resin or the polymer obtained from the monomer have a transition temperature 20 ° C. higher than the base resin (I). The component (II) is believed to control the thermoplastic properties of the resin particle's surface and therefore inhibit the fusion bonds between particles. Typical examples of the resins are polystyrene (Tg=100 ° C.); acrylic resins, e.g. poly(methyl methacrylate) (Tg=105 ° C.), poly(ethyl methacrylate) (Tg=65 ° C.), poly(isopropyl methacrylate) (Tg=81 ° C.), poly(n-butyl methacrylate) (Tg=20 ° C.) and polyacrylonitrile (Tg=100 ° C.); epoxy resins (Tg=50 ° to 150 ° C.); polyamide resins (Tg=100° to 150 ° C.); and the like. Typical examples of the monomers are styrene, methyl methacrylate, ethyl methacrylate, isopropyl methacrylate, n-butyl methacrylate, isobutyl methacrylate, acrylic acid, 2-hydroxyethyl methacrylate, acrylamide, vinyl acetate, acrylonitrile, glycidyl methacrylate, a mixture thereof and the like. The selection of the monomers is known to the art.

According to the present invention, the polyvinyl compound (III) of the resinous component is added for crosslinking with the above mentioned components (I) and (II). The compound (III) enhances a crosslinking degree of the obtained resin particles, and imparts high shape retention and good storage stability to the particles. Typical examples of the compounds (III) are polyhydric (meth)acrylates, e.g. ethyleneglycol di(meth)acrylate, neopentylglycol di(meth)acrylate, trimethylolpropane tri(meth)acrylate, propyleneglycol di(meth)acrylate, 1,6-hexanediol di(meth)acrylate; divinylbenzene; trivinylbenzene; and the like.

The resinous component in the step (a) generally contains a polymerization initiator, especially a radical polymerization initiator. The initiator includes solvent soluble initiators (e.g. azobisisobutylonitrile) and water soluble initiators (e.g. an amine salt of 4,4'-azobis-4-cyanovaleric acid).

The base resin (I) may be present in an amount of 60 to 99% by weight, preferably 70 to 85, based on the total amount of the components (I), (II) and (III). Amounts of less than 60% by weight reduce the rubber resilience of the obtained resin particles, and amounts of more than 99% by weight increase rubber resilience too high. The component (II) may be present in an amount of 0.9 to 30% by weight, preferably 5 to 25% by weight, based on the total amount of the components (I), (II) and (III). Amounts of less than 0.9% by weight observe fusion bonds between particles and amounts of more than 30% by weight deteriorate workability and reduce rubber resilience. The compound (III) may be present in an amount of 0.1 to 10% by weight, preferably 1 to 5% by weight, based on the total amount of the compounds (I), (II) and (III). If the compound (III) is less than 0.1% by weight, the shape retention of the resin particles is deteriorated, thus providing poor storage stability. If it is more than 10% by weight, workability and rubber resilience are poor. The polymerization initiator may be present in an amount of 0.1 to 3 parts by weight based on 100 parts by weight of the total weight of the components (I), (II) and (III).

The above resinous component is dispersed in an aqueous medium. The aqueous medium preferably is water, or a combination of water and a hydrophilic organic solvent. Typical examples of the hydrophilic organic solvents are a lower alcohol (e.g. methyl alcohol, ethyl alcohol and propyl alcohol), ethers (e.g. tetrahydrofuran, diethyl ether, ethyleneglycol monobutyl ether and ethyleneglycol monomethyl ether), a mixture thereof and the like. An amount of the organic solvent is not limited as long as the obtained aqueous medium is uniform. The aqueous medium may contain an emulsifier for controlling water dispersibility and a viscosity modifier. The dispersing method is not limited. For example, if the polymerization initiator is solvent soluble, the components (I), (II) and (III) and the initiator are mixed and then uniformly dispersed with the aqueous medium by shearing force, e.g. a homogenizer. The crosslinking reaction may be conducted during dispersing or after dispersing. The components (I), (II) and (III) are dispersed in an aqueous medium, to which an initiator emulsion is added.

It is preferred that the crosslinking reaction is carried out at a temperature of 40° to 100° C. for 1 to 10 hours.

After crosslinking, the obtained crosslinked resin particles may be isolated from the aqueous medium by a known method. For example, the aqueous medium may be removed from the obtained reaction mixture by a drying method, such as spray drying or freeze drying to obtained dried resin particles. Also, an inorganic salt may be added to the reaction mixture to salt out the particles, and then filtered to isolate the resin particles which are then rinsed and dried.

According to the present invention, the base resin (I) imparts rubber resilience to the crosslinked resin particles. The component (II) effectively inhibits fusion bonds between particles, whereby the redispersibility in an aqueous medium is enhanced. The compound (III) enhances shape retention of the obtained particles, whereby storage stability is significantly improved.

EXAMPLES

The present invention is illustrated by the following Examples which, however, are not to be construed as limiting the present invention to their details.

REFERENCE EXAMPLE 1

A reaction vessel equipped with a stirrer, a reflux condenser, a nitrogen gas inlet and a thermometer was charged with 500 parts by weight of a xylene solution (90% solid content) of polybutadiene having a number average molecular weight of 45,000 (available from Kuraray Co., Ltd as LIR-300), 30 parts by weight of maleic anhydride and one part by weight of N-phenyl-(1,3-dimethylbutyl)-p-phenyldiamine (available from Ouchi Shinko Kagaku Kogyl Co., Ltd. as NOCRAC 6C) and reacted at 190° C. for 6 hours in a nitrogen atmosphere.

To the obtained maleic polybutadiene, 26 parts by weight of 2-hydroxyethyl methacrylate, 58 parts by weight of polyethyleneoxide monolauryl ether (available from Kao Corp. as Emulgen 109P), one part by weight of hydroquinone, 3 parts by weight of N,N-dimethylbenzylamine and 330 parts by weight of xylene were added and reacted at 135° C. for 30 minutes.

The obtained resin has a solid content of 60% by weight, a number average molecular weight of 56,400 and a resin content acid value of 38. Its IR spectrum showed the presence of a polymerizable double bond.

REFERENCE EXAMPLE 2

A reaction vessel equipped with a stirrer, a reflux condenser, a nitrogen gas inlet and a thermometer was charged with 500 parts by weight of a xylene solution (90% solid content) of polyisoprene having a number average molecular weight of 29,000 (available from Kuraray Co., Ltd as LIR-30), 30 parts by weight of maleic anhydride and one part by weight of N-phenyl-(1,3-dimethylbutyl)-p-phenyldiamine (available from Ouchi Shinko Kagaku Kogyl Co., Ltd. as NOCRAC 6C) and reacted at 190° C. for 6 hours in a nitrogen atmosphere.

To the obtained maleic polybutadiene, 26 parts by weight of 2-hydroxyethyl methacrylate, 58 parts by weight of polyethyleneoxide monolauryl ether (available from Kao Corp. as Emulgen 109P), one part by weight of hydroquinone, 3 parts by weight of N,N-dimethylbenzylamine and 330 parts by weight of xylene were added and reacted at 135° C. for 30 minutes.

The obtained resin has a solid content of 60% by weight, a number average molecular weight of 40,400 and a resin content acid value of 40. Its IR spectrum showed the presence of a polymerizable double bond.

REFERENCE EXAMPLE 3

A reaction vessel equipped with a stirrer, a reflux condenser, a nitrogen gas inlet and a thermometer was charged with 192 parts by weight of trimellitate anhydride, 244 parts by weight of a 1:1 mol adduct of 2-hydroxyethyl methacrylate and epsilon-caprolactone (available from Daicel Chemical Industry Ltd. as Praccel FM-1), 100 parts by weight of cyclohexane and 0.1 part by weight of hydroquinone, and reacted at 150° C. for 0.5 hours in a nitrogen atmosphere.

To the obtained mixture, 740 parts by weight of polytetramethyleneglycol diglycidyl ether (available from Nagase Kasei Kogyo Co., Ltd. as Deconal 992), 400 parts by weight of cyclohexane and 0.1 part by weight of hydroquinone were added and reacted at 150° C. for 60 minutes.

The obtained resin has a solid content of 70% by weight, a number average molecular weight of 2,400 and a resin content acid value of 48. Its IR spectrum showed the presence of a polymerizable double bond.

REFERENCE EXAMPLE 4

A reaction vessel equipped with a stirrer, a reflux condenser, a nitrogen gas inlet and a thermometer was charged with 490 parts by weight of a xylene solution (90% solid content) of styrene-isoprene-styrene block copolymer having a number average molecular weight of 30,000 and a styrene content of 10% (available from Kuraray Co., Ltd as LIR-310), 38 parts by weight of maleic anhydride and one part by weight of N-phenyl-(1,3-dimethylbutyl)-p-phenyldiamine (available from Ouchi Shinko Kagaku Kogyl Co., Ltd. as NOCRAC 6C) and reacted at 190 ° C. for 6 hours in a nitrogen atmosphere.

To the obtained styrene-isoprene-styrene block copolymer, 50 parts by weight of 2-hydroxyethyl methacrylate, one part by weight of hydroquinone, 3 parts by weight of N,N-dimethylbenzylamine and 290 parts by weight of xylene were added and reacted at 135° C. for 30 minutes.

The obtained resin has a solid content of 60% by weight, a number average molecular weight of 36,000 and a resin content acid value of 45. Its IR spectrum showed the presence of a polymerizable double bond.

EXAMPLE 1

Dispersing Step

A uniform mixture was prepared by mixing 140 parts by weight of the resin of Reference Example 1 which was neutralized 100% with dimethylethanolamine, 20 parts by weight of methyl methacrylate and 2 parts by weight of divinylbenzene. To the mixture, 450 parts by weight of deionized water and 50 parts by weight of n-propyl alcohol were added and emulsified at 70 ° C. for 30 minutes by a homogenizer.

Crosslinking Step

The obtained emulsion was charged in a reaction vessel equipped with a stirrer, a reflux condenser, a nitrogen gas inlet and a thermometer, to which 100 parts by weight of an aqueous solution of one part by weight of 4,4'-azobis-4-cyanovaleric acid (available from Otsuka Chemical Co., Ltd. as A.C.V.A.) which was neutralized 100 % with methylethanolamine was added and reacted at 85 ° C. for 2 hours in a nitrogen atmosphere. The obtained resin emulsion was observed by an electron microscope to find that an average particle size of the resin emulsion was 110 nm.

Removing Step of the Aqueous Medium

One % calcium chloride solution was slowly added to the obtained emulsion with stirring to salt out the resin particle in the form of small agglomerates (0.1 to several mm particle size), which were filtered, rinsed and dried at 0.5 torr at 45 ° C. to obtain dried resin particles.

EXAMPLE 2

Dispersing Step

A uniform mixture was prepared by mixing 140 parts by weight of the resin of Reference Example 1 which was neutralized 100% with dimethylethanolamine, 20 parts by weight of styrene and 3 parts by weight of 1,6-hexanediol dimethacrylate. To the mixture, 450 parts by weight of deionized water and 50 parts by weight of n-propyl alcohol were added and emulsified at 70 ° C. for 30 minutes by a homogenizer.

Crosslinking Step

The obtained emulsion was charged in a reaction vessel equipped with a stirrer, a reflux condenser, a nitrogen gas inlet and a thermometer, to which 100 parts by weight of an aqueous solution of one part by weight of 4,4'-azobis-4-cyanovaleric acid (available from Otsuka Chemical Co., Ltd. as A.C.V.A.) which was neutralized 100% with methylethanolamine was added and reacted at 85 ° C. for 2 hours in a nitrogen atmosphere. The obtained resin emulsion was observed by an electron microscope to find that an average particle size of the resin emulsion was 124 nm.

Removing Step of the Aqueous Medium

One % calcium chloride solution was slowly added to the obtained emulsion with stirring to salt out the resin particle in the form of small agglomerates (0.1 to several mm particle size), which were filtered, rinsed and dried at 0.5 torr at 45 ° C. to obtain dried resin particles.

EXAMPLE 3

Dispersing Step

A uniform mixture was prepared by mixing 140 parts by weight of the resin of Reference Example 1 which was neutralized 100 % with dimethylethanolamine, 100 parts by weight of a 20 xylene solution of poly(methyl methacrylate) having a number average molecular weight of 300,000 and 3 parts by weight of neopentylglycol dimethacrylate. To the mixture, 450 parts by weight of deionized water and 50 parts by weight of n-propyl alcohol were added and emulsified at 70 ° C. for 30 minutes by a homogenizer.

Crosslinking Step

The obtained emulsion was charged in a reaction vessel equipped with a stirrer, a reflux condenser, a nitrogen gas inlet and a thermometer, to which 100 parts by weight of an aqueous solution of one part by weight of 4,4'-azobis-4-cyanovaleric acid (available from Otsuka Chemical Co., Ltd. as A.C.V.A.) which was neutralized 100 % with methylethanolamine was added and reacted at 85 ° C. for 2 hours in a nitrogen atmosphere. The obtained resin emulsion was observed by an electron microscope to find that an average particle size of the resin emulsion was 145 nm.

Removing Step of the Aqueous Medium

One % calcium chloride solution was slowly added to the obtained emulsion with stirring to salt out the resin particle in the form of small agglomerates (0.1 to several mm particle size), which were filtered, rinsed and dried at 0.5 torr at 45 ° C. to obtain dried resin particles.

EXAMPLE 4

Dispersing Step

A uniform mixture was prepared by mixing 120 parts by weight of the resin of Reference Example 1 which was neutralized 100% with dimethylethanolamine, 60 parts by weight of a 50% butyl acetate solution of bisphenol type epoxy resin (available from Toto Chemical Co., Ltd. as YD-014) and 0.5 parts by weight of ethyleneglycol dimethacrylate. To the mixture, 450 parts by weight of deionized water and 50 parts by weight of n-propyl alcohol were added and emulsified at 70 ° C. for 30 minutes by a homogenizer.

Crosslinking Step

The obtained emulsion was charged in a reaction vessel equipped with a stirrer, a reflux condenser, a nitrogen gas inlet and a thermometer, to which 100 parts by weight of an aqueous solution of one part by weight of 4,4'-azobis-4-cyanovaleric acid (available from Otsuka Chemical Co., Ltd. as A.C.V.A.) which was neutralized 100% with methylethanolamine was added and reacted at 85 ° C. for 2 hours in a nitrogen atmosphere. The obtained resin emulsion was observed by an electron microscope to find that an average particle size of the resin emulsion was 131 nm.

Removing Step of the Aqueous Medium

One % calcium chloride solution was slowly added to the obtained emulsion with stirring to salt out the resin particle in the form of small agglomerates (0.1 to several mm particle size), which were filtered, rinsed and dried at 0.5 torr at 45 ° C. to obtain dried resin particles.

EXAMPLE 5

Dispersing Step

A uniform mixture was prepared by mixing 120 parts by weight of the resin of Reference Example 2 which was neutralized 100% with dimethylethanolamine, 15 parts by weight of styrene, 15 parts by weight of ethyl methacrylate and 10 parts by weight of propyleneglycol diacrylate. To the mixture, 450 parts by weight of deionized water and 50 parts by weight of n-propyl alcohol were added and emulsified at 70 ° C. for 30 minutes by a homogenizer.

Crosslinking Step

The obtained emulsion was charged in a reaction vessel equipped with a stirrer, a reflux condenser, a nitrogen gas inlet and a thermometer, to which 100 parts by weight of an aqueous solution of one part by weight of 4,4'-azobis-4-cyanovaleric acid (available from Otsuka Chemical Co., Ltd. as A.C.V.A.) which was neutralized 100% with methylethanolamine was added and reacted at 85 ° C. for 2 hours in a nitrogen atmosphere. The obtained resin emulsion was observed by an electron microscope to find that an average particle size of the resin emulsion was 254 nm.

Removing Step of the Aqueous Medium

One % calcium chloride solution was slowly added to the obtained emulsion with stirring to salt out the resin particle in the form of small agglomerates (0.1 to several mm particle size), which were filtered, rinsed and dried at 0.5 torr at 45 ° C. to obtain dried resin particles.

EXAMPLE 6

Dispersing Step

A uniform mixture was prepared by mixing 120 parts by weight of the resin of Reference Example 2 which was neutralized 100% with dimethylethanolamine, 150 parts by weight of a 20% xylene solution of polystyrene having a number average molecular weight of 300,000 and 0.1 parts by weight of trivinylbenzene. To the mixture, 450 parts by weight of deionized water and 50 parts by weight of isopropyl alcohol were added and emulsified at 70 ° C. for 30 minutes by a homogenizer.

Crosslinking Step

The obtained emulsion was charged in a reaction vessel equipped with a stirrer, a reflux condenser, a nitrogen gas inlet and a thermometer, to which 100 parts by weight of an aqueous solution of one part by weight of 4,4'-azobis-4-cyanovaleric acid (available from Otsuka Chemical Co., Ltd. as A.C.V.A.) which was neutralized 100% with methylethanolamine was added and reacted at 85 ° C. for 2 hours in a nitrogen atmosphere. The obtained resin emulsion was observed by an electron microscope to find that an average particle size of the resin emulsion was 190 nm.

Removing Step of the Aqueous Medium

One % calcium chloride solution was slowly added to the obtained emulsion with stirring to salt out the resin particle in the form of small agglomerates (0.1 to several mm particle size), which were filtered, rinsed and dried at 0.5 torr at 45 ° C. to obtain dried resin particles.

EXAMPLE 7

Dispersing Step

A uniform mixture was prepared by mixing 140 parts by weight of the resin of Reference Example 3 which was neutralized 100% with dimethylethanolamine, 67 parts by weight of a 30% cyclohexane solution of a polyamide resin (available from Daicel Huls Co., Ltd. as Diamide-PAE), 1 part by weight of trimethylolpropane triacrylate and 1 part by weight of 2,2'-azobis-(2,4-dimethylvalelonitrile) (available from Wako Junyaku Co., Ltd. as V-65). To the mixture, 600 parts by weight of deionized water was added and emulsified at 70 ° C. for 30 minutes by a homogenizer.

Crosslinking Step

The obtained emulsion was charged in a reaction vessel equipped with a stirrer, a reflux condenser, a nitrogen gas inlet and a thermometer, and reacted at 75 ° C. for 1 hour in a nitrogen atmosphere. The obtained resin emulsion was observed by an electron microscope to find that an average particle size of the resin emulsion was 70 nm.

Removing Step of the Aqueous Medium

One % calcium chloride solution was slowly added to the obtained emulsion with stirring to salt out the resin particle in the form of small agglomerates (0.1 to several mm particle size), which were filtered, rinsed and dried at 0.5 torr at 45 ° C. to obtain dried resin particles.

EXAMPLE 8

Dispersing Step

A uniform mixture was prepared by mixing 60 parts by weight of polytetramethyleneglycol diacrylate having a number average molecular weight of 1,200 (available from Hodogaya Chemical Co., Ltd. as AC-PTG 1000), 2 parts by weight of N,N-dimethylaminoethyl acrylate, 1 part by weight of acrylonitrile, 5 parts by weight of ethyleneglycol diacrylate, 2 parts by weight of 2-hydroxyethyl methacrylate, 30 parts by weight of isopropyl methacryalte and 1 part by weight of azobisisobutylonitrile (available from Wako Junyaku Co., Ltd.) To the mixture, 400 parts by weight of a 1 % aqueous solution of sodium laurylsulfate and emulsified at 70 ° C. for 30 minutes by a homogenizer.

Crosslinking Step

The obtained emulsion was charged in a reaction vessel equipped with a stirrer, a reflux condenser, a nitrogen gas inlet and a thermometer, and reacted at 75 ° C. for 1 hour in a nitrogen atmosphere. The obtained resin emulsion was observed by an electron microscope to find that an average particle size of the resin emulsion was 120 nm.

Removing Step of the Aqueous Medium

The obtained emulsion was spray-dried to obtain dried resin particles.

EXAMPLE 9

Dispersing Step

A uniform mixture was prepared by mixing 96 parts by weight of a butadiene-acrylonitrile copolymer having vinyl groups at both ends and a number average molecular weight of 3,500 (available from Ube Kosan Co., Ltd. as HYCAR VTBNX BOOX 23), 1 part by weight of divinylbenzene, 2 parts by weight of N,N-dimethylaminoethoxyethyl acrylate and 10 parts by weight of the resin of Reference Example 1 which was neutralized 100 % with dimethylethanolamine. To the mixture, 900 parts by weight of deionized water and 90 parts by weight of isopropyl alcohol were added and emulsified at 70 ° C. for 30 minutes by a homogenizer.

Crosslinking Step

The obtained emulsion was charged in a reaction vessel equipped with a stirrer, a reflux condenser, a nitrogen gas inlet and a thermometer, to which 100 parts by weight of an aqueous solution of one part by weight of 4,4'-azobis-4-cyanovaleric acid (available from Otsuka Chemical Co., Ltd. as A.C.V.A.) which was neutralized 100% with methylethanolamine was added and reacted at 85 ° C. for 2 hours in a nitrogen atmosphere. The obtained resin emulsion was observed by an electron microscope to find that an average particle size of the resin emulsion was 100 nm.

Removing Step of the Aqueous Medium

The obtained emulsion was freeze-dried to obtain dried resin particles.

EXAMPLE 10

Dispersing Step

A uniform mixture was prepared by mixing 140 parts by weight of the resin of Reference Example 4 which was neutralized 100% with dimethylethanolamine, 20 parts by weight of methyl methacrylate and 2 parts by weight of divinylbenzene. To the mixture, 450 parts by weight of deionized water and 50 parts by weight of n-propyl alcohol were added and emulsified at 50 ° C. for 60 minutes by a homogenizer.

Crosslinking Step

The obtained emulsion was charged in a reaction vessel equipped with a stirrer, a reflux condenser, a nitrogen gas inlet and a thermometer, to which 100 parts by weight of an aqueous solution of one part by weight of 4,4'-azobis-4-cyanovaleric acid (available from Otsuka Chemical Co., Ltd. as A.C.V.A.) which was neutralized 100% with methylethanolamine was added and reacted at 85 ° C. for 2 hours in a nitrogen atmosphere. The obtained resin emulsion was observed by an electron microscope to find that an average particle size of the resin emulsion was 440 nm.

Removing Step of the Aqueous Medium

One % calcium chloride solution was slowly added to the obtained emulsion with stirring to salt out the resin particle in the form of small agglomerates (0.1 to several mm particle size), which were filtered, rinsed and dried at 0.5 torr at 45 ° C. to obtain dried resin particles.

TEST EXAMPLE

Test for Swelling Degree and Storage Stability in an Organic Solvent

The dried particles of each one of Examples 1 to 7 were dispersed in N,N-dimethylformamide (DMF) and the change of the particle size betweem in the resin emulsion of each Crosslinking step and in DMF was determined. The results and the swelling degree are shown in Table 1.

TABLE 1

| | Example No. | | | | | | |
|---|---|---|---|---|---|---|---|
| | 1 | 2 | 3 | 4 | 5 | 6 | 7 |
| Particle size (A) in resin emulsion (nm)*1 | 100 | 124 | 145 | 131 | 254 | 190 | 70 |
| Particle size (B) in DMF (nm)*1 | 119 | 141 | 172 | 145 | 307 | 243 | 81 |
| Swelling degree*2 | 1.27 | 1.47 | 1.67 | 1.36 | 1.77 | 2.09 | 1.55 |

*1 The particle size was determined by a laser light scattering method after dispersing the particles for 3 days at 25° C.
*2 The swelling degree was calculated from the following equation;

$$\text{Swelling degree} = \frac{\text{Particle volume swelled in DMF}}{\text{Particle volume swelled in the resin emulsion}} \text{ thus, } = \frac{3/4\pi(B/2)^3}{3/4\pi(A/2)^3}$$

The above resin particles were stable and had good shape retention after dispersing in DMF for one week.

For comparison, resin particles were prepared by the conventional post-emulsion method, but had many fusion bonds between particles to form large agglomerates. The particles were dispersed in DMF, but severely swelled.

What is claimed is:

1. A process for preparing crosslinked resin particles by a post-emulsion method comprising
    (a) dispersing in an aqueous medium a resinous component comprising
        (I) a base resin having a glass transition temperature (Tg) of 0 ° C. or less and a polymerizable double bond,
        (II) a monomer which, when polymerized, provides a resin of which Tg is 20 ° C. higher than that of said base resin, or a resin of which Tg is 20 ° C. higher than that of said base resin, and
        (III) a polyvinyl compound
    (b) crosslinking inside the dispersed resinous component and
    (c) removing said aqueous medium therefrom.

2. The process according to claim 1 wherein said base resin is selected from the group consisting of acryl rubber having a [(Tg=[−10]−20 to [−40]−50° C.)], polybutadiene having a [(Tg=−95 to −110° C.)], polyisoprene having a [(Tg= −63 to −72° C.)], chloroprene having a [(tg= −45° C.)], styrene-butadiene rubber having a [(Tg= −40° C.)], [acrylonitrile-butadiene rubber (Tg= −20° to −50° C.)], butyl rubber having a [(Tg= −67° to −75° C.)], a copolymer of trumellitate amhydride and an adduct of 2-hydroxyethylmethacrylate and epsilon-caprolactone having a [(Tg= −60° C.)]and polytetramethyleneglycol diacrylate having a [(Tg= −40° to −100° C.)].

3. The process according to claim 1 wherein said base resin is modified by introducing water dispersible or soluble group.

4. The process according to claim 1 wherein said base resin has a number average molecular weight of 500 to 1,000,000.

5. The process according to claim 1 wherein said monomer of the component (II) is selected from the group consisting of styrene, methyl methacrylate, ethyl methacrylate, isopropyl methacrylate, n-butyl methacrylate, isobutyl methacrylate, acrylic acid, 2-hydroxyethyl methacrylate, acrylamide, vinyl acetate, acrylonitrile, glycidyl methacrylate and a mixture thereof.

6. The process according to claim 1 wherein said resin of the component (II) is selected from the group consisting of polystyrene having a [(Tg=100° C.)], poly(methyl methacryalte) having a [(Tg=105° C.)], poly(ethyl methacrylate) ahving a [(TG=65° C.)], poly(isopropyl methacryalte having a [(Tg=65° C.)], poly(isopropyl methacrylate) having a [(tg=81° C.)], polyacrylonitrile having a [(Tg=100° C.)], an epoxy resin having a [(Tg=50° to 150° C.)]and a polyamide resin having a [(Tg=100° to 150° C.)].

7. The process according to claim 1 wherein said compound (III) is selected from the group consisting of ethyleneglycol di(meth)acrylate, neopentylglycol di(meth)acrylate, trimethylolpropane tri(meth)acrylate, propyleneglycol di(meth)acrylate, 1,6-hexanediol di(meth)acrylate, divinylbenzene, trivinylbenzene and a mixture thereof.

8. The process according to claim 1 wherein said resinous component in the step (a) contains a polymerization initiator.

9. The process according to claim 8 wherein said polymerization initiator is azobisisobutylonitrile or an amine salt of 4,4'-azobis-4-cyanovaleric acid.

10. The process according to claim 1 wherein said resinous component contains 60 to 99% by weight of the base resin, 0.9 to 30% by weight of the component (II) and 0.1 to 10% by weight of the compound (III), % being based on the total amount of the components (I), (II) and (III).

11. The process according to claim 8 wherein said polymerization initiator is present in an amount of 0.1 to 3 parts by weight based on 100 parts by weight of the total weight of the components (I), (II) and (III).

12. The process according to claim 1 wherein said crosslinking reaction is carried out at a temperature of 40° to 100 ° C. for 1 to 10 hours.

13. Crosslinked resin particles obtained by the process according to claim 1.

14. The process according to claim 1 wherein said base resin is selected from the group consisting of a acryl rubber polybutadiene, polyisoprene, chloroprene, styrene-butadiene rubber, a copolymer of trimellitate amhydride and an adduct of 2-hydroxyethylmethacrylate and epsilon-caprolactone, and polytetramethyleneglycol diacrylae.

15. The process according to claim 1 wherein said resin of the component (II) is selected from the group consisting of polystyrene, poly(methyl methacrylate), poly(ethyl methacrylate), poly(isopropyl methacrylate), poly(n-butyl methacrylate, polyacrylonitrile, an epoxy resin, and a polyamide resin.

* * * * *